March 12, 1957

M. TURCHAN 2,784,739

METERING AND SHUTOFF VALVE

Filed May 19, 1954

INVENTOR.
MANUEL TURCHAN
BY
Robert A. Sloman
ATTORNEY

United States Patent Office 2,784,739
Patented Mar. 12, 1957

2,784,739

METERING AND SHUTOFF VALVE

Manuel Turchan, Dearborn, Mich.

Application May 19, 1954, Serial No. 430,856

3 Claims. (Cl. 137—614.18)

This invention relates to a metering and shutoff valve, and more particularly to a manually operable fluid control valve.

It is the object of the present invention to provide a metering valve construction wherein not only does the valve provide means for controlling the quantity of fluid flow therethrough but also provides a positive shutoff of fluid flow.

This and other objects will be seen from the following specification and claims in conjunction with the appended drawing, in which:

Figure 1:
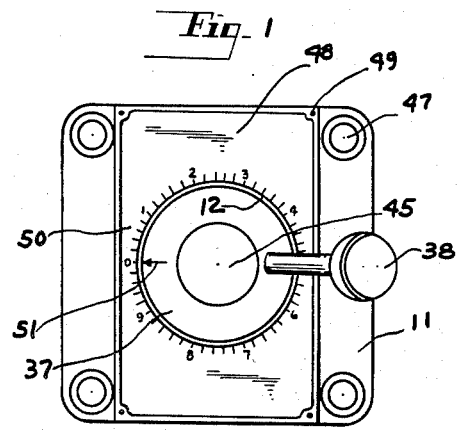
Fig. 1 is a front elevational view of the metering and shutoff valve.

It will be understood that the above drawing illustrates merely one preferred embodiment of the invention, and that other embodiments are contemplated within the scope of the claims hereafter set forth.

Referring to the drawing, the present metering and shutoff valve includes valve body 11 having formed therein longitudinal bore 13. This bore at one end communicates with bore 12 of increased diameter, and at its other end communicates with bore 14 of increased diameter.

Cylindrically shaped plunger 15 is slidably reciprocal longitudinally within bore 13 and has longitudinal slot 16' receiving key 16 for limiting movements of plunger 15 to longitudinal movements.

Said plunger terminates at one end in an annular tapered valve element 17 of reduced diameter, which is adapted for registration within the axial passage 27 formed within valve seat 19. Said passage at its outer end is defined by the annular valve seat element 18, which is adapted for operative engagement with a portion of tapered valve element 17 for closing off the flow of pressure fluid from passage 27 into bore 13.

Figure 4:
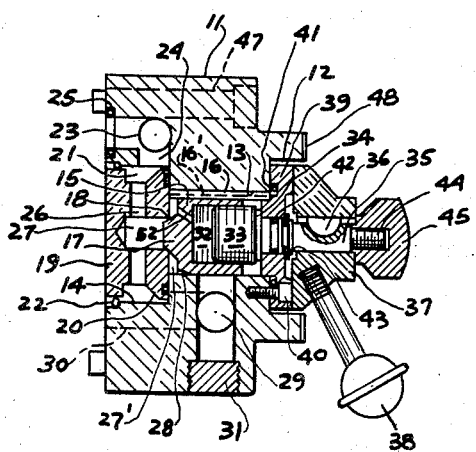
Fig. 4 is a section taken on line 4—4 of Fig. 3.

Valve seat 19 is circular in shape and is loosely positioned within bore 14 with suitable oil seal 22 interposed as shown in Fig. 4. Said seat has an exterior annular opening 21 bounded upon one side by the tapered wall 20 formed in said valve seat whereby pressure fluid will be in communication with said valve seat throughout its circumference within annular passage 21.

Extending from the rear wall of valve body 11 there is provided fluid inlet opening 23 which through passage 24 communicates with annular opening 21, there being a suitable oil seal 25 at the outer end of inlet opening 23 for cooperation with a conduit supplying pressure fluid to the interior of the valve body.

Valve seat 19 has a pair of diametrically opposed radial passages 26 communicating at their respective outer ends with annular opening 21 and at their inner ends with passage 27 which is axial of bore 13 and of less diameter.

In the position of plunger 15 shown in Fig. 4, the body of said plunger closes off the inner end of fluid outlet opening 29, the outer end of which joins fluid outlet opening 30 terminating in the rear wall of said valve body and adapted for connection with a suitable fluid conduit, not shown.

In view of the tapered valve element 17, there is provided at the end of bore 13 adjacent valve seat element 18 chamber 27', which in the position of valve element 17 of Fig. 4, is completely closed off from communication with fluid supply passage 27.

Formed in the exterior surface of plunger 15 adjacent chamber 27' there is formed a longitudinally extending tapered slot 28, one end of which communicates with chamber 27'. However, in the closed position of valve element 17, the opposite end of the slot is closed off from outlet opening 29. Upon rearward longitudinal adjustment of plunger 15 unseating valve element 17, fluid communication is established between passage 27 and chamber 27', however there will be no flow of this fluid through outlet opening 29 until the tapered slot 28 registers therewith. When plunger 15 is withdrawn sufficiently, there will be a metered flow of pressure fluid from chamber 27' into outlet opening 29. The amount of fluid metered through slot 28 will depend upon how far the plunger is withdrawn from the position shown in Fig. 4 thereby effectively metering and controlling the flow of pressure fluid through outlet opening 29—30. Plug 31, Fig. 4 closes off the branch of outlet conduit 29.

Thus valve element 17 positively opens and closes the flow of pressure fluid from passage 27. On the other hand, after valve element 17 is unseated, the tapered slot 28 takes over the control or metering of pressure fluid into opening 29.

In the preferred embodiment of the invention, longitudinal movements of plunger 15 are effected by manual rotation of exteriorly threaded plunger 33 which is retained against axial displacement in the manner hereafter described and threadedly engages the interiorly threaded bore 32 of plunger 15. Plunger 33 has a reduced shoulder 34 which operatively bears against apertured valve cap 39 bolted at 40 to said valve body and which is positioned within bore 12. Shoulder 34 terminates in valve stem 35 of reduced diameter, which is rotatably positioned within said valve cap and extends through handle hub 37. Stem 35 carries key 36 slidable within an elongated internal slot in handle hub 37 whereby rotation of said hub effects rotation of valve stem 35 and plunger 33 secured thereto. At the same time key 36 provides for limited relative longitudinal movement between said stem and handle hub 37, which has an operating handle 38 projecting angularly outward therefrom as shown in Figs. 1 and 4.

Valve cap 39 has an internal annular recess adjacent the base of bore 12 and within which is nested oil seal 41 for sealing off the interior of bore 13 to which pressure fluid may be supplied.

An annular slot is formed in valve stem 35 positioned within valve cap 39 and which also receives oil seal 42 for preventing seepage of pressure fluid outwardly of bore 13.

A second annular slot is formed within a portion of said valve stem adjacent the outer surface of said valve cap, within which is removably positioned locating ring 43, which is cooperable with said valve cap for preventing longitudinal movement to the left of said valve stem and plunger 33.

The outer end of valve stem 35 terminates in the threaded element 44 of reduced diameter, over which is threaded lock nut 45 which may be tightened into frictional engagement with handle hub 37 for securing said hub in any selected rotated position setting the metering of the flow of pressure fluid through the valve.

Figure 2:
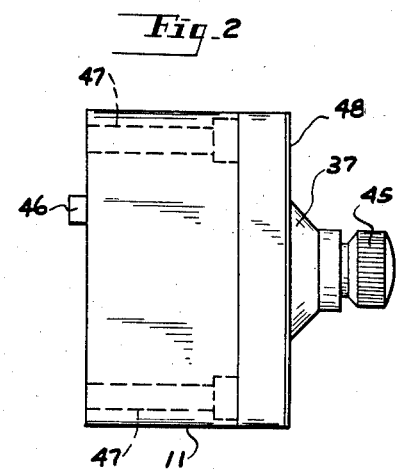
Fig. 2 is a left side elevational view thereof.
Figure 3:
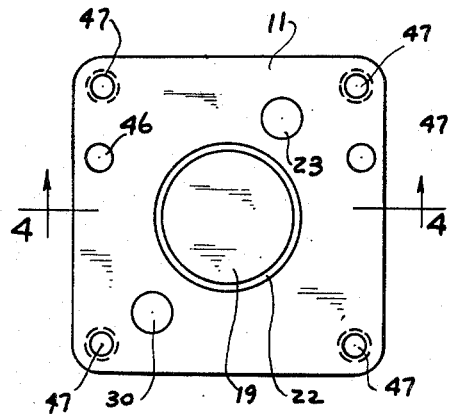
Fig. 3 is a rear elevational view thereof showing the fluid inlet and outlet openings.

As shown in Figs. 2 and 3 there are provided a pair of outwardly projecting rest pins 46 which serve as locating means when mounting the valve body upon a supporting plate or other structure. A plurality of longitudinal openings 47 are formed through said valve body to permit the securing of the valve body to such supporting plate or other structure.

Mounted upon the front face of said valve body is name plate 48 which is centrally apertured corresponding to bore 12 and within which partially projects handle hub 37 carrying the arrow or marker 51. A series of calibrations 50 or other indicia are applied to plate 48 in a circle around the central opening of said plate to thereby provide a positive means for setting the rotated position of the handle hub, in turn controlling metering of pressure fluid through the valve body.

As shown in Fig. 4 slot 52 in plunger 15 provides communication between bore 13 and the bore 32 of said plunger to permit the passage of fluid therebetween, permitting escape of fluid upon relative movement of said plunger towards plunger 33.

Having described my invention, reference should now be had to the claims which follow for determining the scope thereof.

I claim:

1. A metering and shutoff valve comprising a valve body having a longitudinal bore therein, an axially reciprocal plunger slidably positioned in said bore, a valve seat within said body at one end of said bore having an axial passage of less diameter than said bore and communicating therewith defining a seat element, a tapered valve element axially projecting from said plunger and registerable within said passage and seat element for opening and closing fluid communication between said passage and bore, there being a fluid inlet opening in said body communicating with said passage and a fluid outlet opening communicating with said bore, said outlet opening being normally closed by said plunger, said plunger having a tapered longitudinal slot in its outer surface adjacent said outlet opening, and manual means engageable with said plunger for effecting controlled axial movements thereof whereby said tapered slot adjustably meters the flow of fluid through said outlet opening upon unseating of said valve element, said body having a second bore on one side communicating with and of greater diameter than said first bore, said valve seat being loosely positioned within said second bore and laterally movable therein to self align with said tapered valve element, and an annular seal in said second bore intermediate said valve seat and body.

2. A metering and shutoff valve comprising a valve body having a longitudinal bore therein, an axially reciprocal plunger slidably positioned in said bore, a valve seat within said body at one end of said bore having an axial passage of less diameter than said bore and communicating therewith defining a seat element, a tapered valve element axially projecting from said plunger and registerable within said passage and seat element for opening and closing fluid communication between said passage and bore, there being a fluid inlet opening in said body communicating with said passage and a fluid outlet opening communicating with said bore, said outlet opening being normally closed by said plunger, said plunger having a tapered longitudinal slot in its outer surface adjacent said outlet opening, and manual means engageable with said plunger for effecting controlled axial movements thereof whereby said tapered slot adjustably meters the flow of fluid through said outlet opening upon unseating of said valve element, said valve seat being of cylindrical form with an exterior annular slot communicating with said inlet opening, said seat having therein a pair of opposed radial recesses communicating at their outer ends with said annular slot and at their inner ends with said axial passage, said body having a second bore on one side communicating with and of greater diameter than said first bore, said valve seat being loosely positioned within said second bore and laterally movable therein to self align with said tapered valve element, and an annular seal in said second bore intermediate said valve seat and body.

3. A metering and shutoff valve comprising a valve body having a longitudinal bore therein, an axially reciprocal plunger slidably positioned in said bore, a valve seat within said body at one end of said bore having an axial passage of less diameter than said bore and communicating therewith defining a seat element, a tapered valve element axially projecting from said plunger and registerable within said passage and seat element for opening and closing fluid communication between said passage and bore, there being a fluid inlet opening in said body communicating with said passage and a fluid outlet opening communicating with said bore, said outlet opening being normally closed by said plunger, said plunger having a tapered longitudinal slot in its outer surface adjacent said outlet opening, and manual means engageable with said plunger for effecting controlled axial movements thereof whereby said tapered slot adjustably meters the flow of fluid through said outlet opening upon unseating of said valve element, said manual means comprising a rotatable valve stem projecting within said body axially of its longitudinal bore and retained against axial displacement, a second plunger on the end of said stem threadedly engaging said first plunger for controlling longitudinal movements thereof, said body having upon one side a second bore of greater diameter than said first bore and communicating therewith, a centrally apertured valve cap positioned within said second bore and supportably receiving said valve stem, a manually rotatable handle hub positioned over and joined to said valve stem for rotation therewith and slidably registerable with said valve cap, said handle hub being keyed to said valve stem for relative longitudinal adjustment, and a lock nut threaded upon the outer end of said valve stem and operatively engageable with said handle hub for frictionally securing the same in any selected position of rotated adjustment.

References Cited in the file of this patent

UNITED STATES PATENTS

| | | |
|---|---|---|
| 1,179,711 | Fitts | Apr. 18, 1916 |
| 1,374,621 | Wicker | Apr. 12, 1921 |
| 1,510,528 | Sebenste | Oct. 7, 1924 |
| 2,330,610 | Natter | Sept. 28, 1943 |
| 2,574,851 | Wagner | Nov. 13, 1951 |